(12) United States Patent
Kienzle et al.

(10) Patent No.: US 9,046,138 B2
(45) Date of Patent: Jun. 2, 2015

(54) FRICTION DISCS HAVING A STRUCTURED CERAMIC FRICTION LAYER AND METHOD OF MANUFACTURING THE FRICTION DISCS

(71) Applicant: SGL CARBON SE, Wiesbaden (DE)

(72) Inventors: Andreas Kienzle, Moettingen Ortseil Balgheim (DE); Ingrid Kraetschmer, Biberbach (DE)

(73) Assignee: SGL Carbon SE, Wiesbaden (DE)

( * ) Notice: Subject to any disclaimer, the term of this patent is extended or adjusted under 35 U.S.C. 154(b) by 159 days.

(21) Appl. No.: 13/930,564

(22) Filed: Jun. 28, 2013

(65) Prior Publication Data

US 2013/0284558 A1    Oct. 31, 2013

Related U.S. Application Data

(63) Continuation of application No. PCT/EP2011/074196, filed on Dec. 28, 2011.

(30) Foreign Application Priority Data

Dec. 28, 2010 (EP) .................................. 10197217

(51) Int. Cl.
| | | |
|---|---|---|
| *F16D 11/00* | (2006.01) | |
| *F16D 13/64* | (2006.01) | |
| *C04B 35/573* | (2006.01) | |
| *C04B 35/628* | (2006.01) | |
| *C04B 35/76* | (2006.01) | |
| *C04B 35/80* | (2006.01) | |
| *C04B 35/83* | (2006.01) | |
| *C04B 37/00* | (2006.01) | |
| *F16D 69/02* | (2006.01) | |
| *F16D 69/00* | (2006.01) | |

(52) U.S. Cl.
CPC .......... *F16D 13/64* (2013.01); *F16D 2200/006* (2013.01); *F16D 2200/0082* (2013.01); *F16D 2200/0052* (2013.01); *C04B 35/573* (2013.01); *C04B 35/62873* (2013.01); *C04B 35/76* (2013.01); *C04B 35/806* (2013.01); *C04B 35/83* (2013.01); *C04B 37/005* (2013.01); *C04B 37/008* (2013.01); *C04B 2235/3813* (2013.01); *C04B 2235/3826* (2013.01); *C04B 2235/425* (2013.01); *C04B 2235/48* (2013.01); *C04B 2235/522* (2013.10); *C04B 2235/5232* (2013.01); *C04B 2235/524* (2013.01); *C04B 2235/5248* (2013.01); *C04B 2235/5256* (2013.01); *C04B 2235/5276* (2013.01); *C04B 2235/5436* (2013.01); *C04B 2237/08* (2013.01); *C04B 2237/083* (2013.01); *C04B 2237/086* (2013.01); *C04B 2237/363* (2013.01); *C04B 2237/365* (2013.01); *C04B 2237/385* (2013.01); *C04B 2237/61* (2013.01); *F16D 69/023* (2013.01); *F16D 2069/004* (2013.01); *F16D 2200/0047* (2013.01)

(58) Field of Classification Search
CPC   C04B 35/80; C04B 35/83; C04B 2235/5244; C04B 2237/363; C04B 2237/365; F16D 2200/006; F16D 2200/0047; F16D 2200/0052; F16D 2200/0082
USPC .................. 188/218 XL, 250 B; 192/107 M; 264/29.1; 156/89.11, 89.13, 89.25, 156/89.26, 155; 428/317.1, 317.7
See application file for complete search history.

(56) References Cited

U.S. PATENT DOCUMENTS

| | | | |
|---|---|---|---|
| 6,042,935 A | 3/2000 | Krenkel et al. | |
| 6,759,117 B2 | 7/2004 | Bauer et al. | |
| 6,908,660 B2 * | 6/2005 | Bauer et al. | 428/163 |
| 7,445,095 B2 | 11/2008 | Bauer et al. | |
| 8,906,289 B2 * | 12/2014 | Kienzle et al. | 264/643 |
| 2002/0068164 A1 * | 6/2002 | Martin | 428/317.9 |
| 2002/0153213 A1 * | 10/2002 | Gruber et al. | 188/218 XL |
| 2013/0133997 A1 * | 5/2013 | Iwai et al. | 188/218 XL |
| 2013/0284548 A1 * | 10/2013 | Guether et al. | 188/218 XL |

FOREIGN PATENT DOCUMENTS

| | | |
|---|---|---|
| DE | 4438456 A1 | 5/1996 |
| EP | 1277715 A2 | 1/2003 |
| EP | 1314708 A2 | 5/2003 |
| EP | 1251290 B1 | 4/2006 |
| EP | 1273818 B1 | 9/2006 |
| EP | 2058545 A2 | 5/2009 |
| EP | 2058546 A2 | 5/2009 |
| EP | 2213902 A2 | 8/2010 |

OTHER PUBLICATIONS

International Search Report of PCT/EP2011/074196, Dated Apr. 24, 2012.

\* cited by examiner

*Primary Examiner* — Vishal Sahni
(74) *Attorney, Agent, or Firm* — Laurence A. Greenberg; Werner H. Stemer; Ralph E. Locher

(57) ABSTRACT

A cylindrical ring-shaped friction disc contains a support body, at least one friction layer, and in each case an intermediate layer arranged between the support body and the friction layer. The intermediate layer has mutually adjoining flat regions with different coefficients of thermal expansion. A method teaches how to produce such a friction disc, and to the use the friction disc as parts of brake and clutch systems, in particular for motor vehicles.

8 Claims, No Drawings

FRICTION DISCS HAVING A STRUCTURED CERAMIC FRICTION LAYER AND METHOD OF MANUFACTURING THE FRICTION DISCS

CROSS-REFERENCE TO RELATED APPLICATION

This is a continuation application, under 35 U.S.C. §120, of copending international application No. PCT/EP2011/074196, filed Dec. 28, 2011, which designated the United States; this application also claims the priority, under 35 U.S.C. §119, of European patent application No. EP 10197217.2, filed Dec. 28, 2010; the prior applications are herewith incorporated by reference in their entireties.

BACKGROUND OF THE INVENTION

Field of the Invention

The invention relates to friction discs with a structured ceramic friction layer, particularly brake discs containing a ceramic support body and at least one friction layer, wherein the support body and/or the friction layer may be made of carbon fiber-reinforced ceramic materials (carbon ceramic), and a method for production thereof.

Carbon ceramic brake discs with ceramic friction layers are known from European patent EP 1 273 818 B1, corresponding to U.S. Pat. No. 7,445,095, among other sources. European patent EP 1 251 290 B1, corresponding to U.S. patent publication No. 2002/0153213, describes friction discs of such kind in which the friction layer is provided with recesses, which may be radially trapezoidal, spiral or involute curved, elliptical, circular or polygonal in shape and help to improve cooling of the carbon-ceramic brake disc. A shaped body made from fiber-reinforced composite materials with a segmented cover layer is known from European patent EP 1 314 708 B1, corresponding to U.S. Pat. No. 6,908,660. In this case, the ceramic segments are preferably separated from each other by webs or web-like regions made from a material that is different from the friction material. The average diameter of the segments is preferably at least 3 mm, and the thickness of the webs is preferably 0.1 mm to 10 mm. Friction discs with a structured friction layer wherein the friction layer is divided into segments by grooves are known from European patent application EP 2 213 902 A2. Here, the width of the grooves is between 0.1 mm and 5 mm, and the depth thereof is at least 0.4 mm. Such friction discs exhibit improved response to wet conditions.

It was found during the studies that led to the present invention that the response to wet conditions and the development of a stable coefficient of friction when the brake lining comes into contact with the friction surface of a carbon-ceramic brake disc in the presence of water or aqueous solutions or aqueous slurries still needs improvement.

BRIEF SUMMARY OF THE INVENTION

It is accordingly an object of the invention to provide friction discs having a structured ceramic friction layer and a method of producing the friction discs which overcomes the above-mentioned disadvantages of the prior art methods and devices of this general type, especially a carbon ceramic brake disc, in such manner that both the response to wet conditions and the development of the coefficient of friction thereof may be improved.

With the foregoing and other objects in view there is provided, in accordance with the invention a cylindrical annular friction disc. The cylindrical annular friction disc contains a support body, at least one friction layer and an intermediate layer disposed between each support body and friction layer. The intermediate layer has contiguous areal zones with differing coefficients of thermal expansion.

It has been found that the objective can be achieved by selected structuring of the expansion crack microstructure of the friction layer that is formed during cooling of a friction disc, particularly a carbon-ceramic brake disc, containing a support body with a matrix including silicon carbide and at least one friction layer, preferably one friction layer arranged on each of the upper and lower cover surfaces of the cylindrical annular support body and attached areally thereto after treatment thereof with silicon.

The different thermal expansion properties of the materials of the support body and the friction layer or layers attached thereto typically result in the formation of a random crack pattern in the friction layer during cooling after siliconization with liquid silicon at a temperature above 1420° C., the melting temperature of silicon, that is to say when the temperature is reduced by at least 1,000 K.

If the friction layers are perfused by a crack pattern that is formed in a determined manner, also referred to as "intentional" in the following, that is to say deliberately and not at random, the response to wet conditions and the development of a stable coefficient of friction in the braking system consisting of the brake linings and the brake discs when the brake lining comes into contact with the friction surface in the presence of water may be influenced in such manner that a stable braking behavior is achieved within a response time of less than 2 seconds, more particularly within 1 to 3 seconds, with a coefficient of friction that is less than 50% lower than for dry braking. Moreover, no increase in this response time was observed as the period of use of the brake disc increased. The sharp fall in the coefficient of friction to as low as 25% of the value for the same functional pair under dry conditions with a friction layer that is not deliberately structured may thus be avoided.

It was found that the targeted formation of a crack pattern characterized by the width of the cracks between the raised segments in the friction layer that are surrounded by the cracks as well as the size and size distribution of these segments may be controlled via the composition and thickness of an intermediate layer or adhesive layer located between the friction layer and the support body, the intermediate or adhesive layer being interposed between the friction layer and the support body when the green bodies for support bodies and friction layers are assembled.

This intermediate layer or adhesive layer otherwise only served to fix the at least one friction layer, in the case of a carbon ceramic brake disc on the porous, carbon-fiber reinforced support bodies before the subsequent processing steps. Such an intermediate layer is known for example from published, non-prosecuted German patent application DE 44 38 456 A1, wherein an insert consisting of a porous, cellulose-based pyrolysable material, but which may also be a non-woven or a carbon mat may be positioned between the supporting body and the friction layer of a multilayer carbon-ceramic brake disc during production. The intermediate layer covers the entire contact surface between the supporting body and the friction layer. During siliconization, the intermediate layer is initially carbonized when heated in the absence of oxidizing gases, and then infiltrated with silicon together with the friction layer (or friction layers) and the support body, wherein at least some of the carbon formed when the material of the intermediate layer is pyrolyzed is converted into silicon carbide.

The intermediate layer is now required to fulfill a new task. Structuring the intermediate layer, which was homogeneous in the documents of the prior art, into layer zones with different coefficients of thermal expansion, for example, by using different material compositions such as by adding silicon carbide powder or carbon powder to the adhesive compound or adding different binders to the adhesive compound, different mixture ratios of phenolic resins and pitches for example, tensions are created in the intermediate layer between the friction layer and the support body during cooling after siliconization, which tensions result in the selective, that is to say intentional, formation of cracks in the ceramic friction layer.

The thermal expansion differential may also be achieved in a preferred manner by an intermediate layer that contains a woven fabric of filament bundles, preferably made of carbon. The carbon filaments are bundled in the usual way, wherein the typical filament yarns with 3,000, 6,000 or 12,000 filaments per strand of yarn ("3 k", "6 k", "12 k") are used for preference. Since the coefficient of thermal expansion in the longitudinal direction of these filaments differs significantly from the coefficient of thermal expansion perpendicular thereto (in polyacrylonitrile-based carbonized filaments— longitudinally $0.6 \cdot 10^{-6} K^{-1}$ to $0.75 \cdot 10^{-6} K^{-1}$ and transversely $8 \cdot 10^{-6} K^{-1}$ to $9 \cdot 10^{-6} K^{-1}$), if the number of filaments per strand of yard and the bonding in the woven fabric are chosen appropriately, a tension pattern can be set up in the intermediate layer that results in the formation of intentional cracks upon cooling. In addition, it is preferably also possible to leave free zones between each strand in both the warp and the weft so that a mesh-like weave or braid is created with spaces between the individual weft and warp yarn strands.

The structure of the intermediate layer imposed in this way results in an expansion crack microstructure that is defined intentionally, that is to say formed according to a plan, in the friction layer during cooling after siliconization, and this in turn, with a suitable choice of dimensions, leads to an improvement in the development of a coefficient of friction when braking in wet conditions. In this context, the speed with which the coefficient of friction is developed may be influenced in a surprising manner by the size of the contiguous zones of the friction layer, the contiguous friction layer zones being separated from each other by the cracks. It was found that the speed of development of the coefficient of friction is approximately inversely proportional to the size, that is to say the average dimension in the plane of the surface, of the contiguous friction layer zones.

Therefore, the invention relates to a friction disc containing a supporting body and at least one friction layer, and one intermediate layer each arranged between the support body and the friction layer, wherein the intermediate layer has adjacent areal zones with different coefficients of thermal expansion. The difference in the thermal expansion of adjacent areas with a different thermal expansion is preferably at least 5% of the higher value for the coefficient of linear thermal expansion, preferably at least 10% of this value. A zone in the intermediate layer that extends in a plane perpendicular to the axis of symmetry or rotation of the cylindrical annular friction disc is designated as the areal zone.

The invention further relates to a method for producing friction discs with an intentional expansion crack microstructure, that is to say a microstructure that is planned and formed deliberately in the friction layer. The method includes the steps of:

preparing a preform for the support body of porous carbon, which is preferably reinforced with high-temperature-resistant fibers, preparing a preform for the friction layer body of porous carbon, which advantageously contains silicon carbide as a filler, adhesively bonding at least one friction layer preform on the support layer body by an adhesive layer containing as the organic binder a thermosetting resin and optionally pitch and/or a thermoplastic plastic, and at least one of the additives selected from elemental carbon, carbides, nitrides and silicides of metals and semi-metals of groups IIIb, IVb and Vb according to the old IUPAC nomenclature, that is to say groups 13, 14, and 15 according to the new IUPAC nomenclature of the periodic table of elements, high temperature-resistant fibers selected from carbon fibers, fibers of binary and ternary compounds of the elements Si, C, N, B, O, and P, and whiskers of refractory metals, pyrolysing the resulting composite material in the absence of oxidizing agents, thereby obtaining carbon from the organic binders, infiltrating the carbonized composite with liquid silicon or a liquid alloy containing a mass fraction of at least 50% silicon, thereby forming carbides of silicon and possibly of the other alloy components, and cooling the siliconized composite according to a selectable temperature profile in which an intermediate layer is formed from the adhesive layer by the steps of carbonization and infiltration with subsequent reaction to form carbides.

According to the invention, the adhesive layer may be formed from:

a carbon filament bundle mesh weave fabric with plain weave that is impregnated or coated with an adhesive, can be converted into carbon by heating in the absence of oxidizing substances to temperatures of about 800° C. or more, by uneven application of an adhesive, wherein the adhesive beads formed from the carrier may be applied preferably in the form of a grid, preferably intersecting at right angles, or in the form of a spider's web with concentric circles or spirals and radii that intersect these circles or spirals, by screen printing or by a computer-controlled applicator, by solidifying an adhesive on an anti-adhesively treated smooth surface such as glass or polished metal, by heating to a state (for phenolic resole resins in the "B-stage"), which allows the film that is formed by solidification to be punched out to create a grid-like overlay, and which later returns to an adhesive state under further heating before reaching the C-stage (formation of resite for phenolic resole resins) for cross-linked and non-melting thermoset.

This adhesive is preferably a thermosetting resin or pitch, or a mixture thereof, wherein the adhesive may also contain other additives such as heat-resistant inorganic materials. Preferred as such are powders of silicon carbide, boron carbide, titanium boride, or boron nitride. According to the invention it is also possible to modify the adhesive by sprinkling with heat-resistant fibers such as fibers of carbon, silicon carbide or silicon nitride, also whiskers of ceramic or metallic materials, or mixing such with the adhesive in such manner that when the adhesive solidifies these admixtures cause the formation of anisotropic structures. The fibers used for this purpose usually have average lengths of up to 5 mm.

The structure formed in the intermediate layer preferably has an average dimension parallel to the bottom surface or cover surface of the cylindrical annular friction plate of the individual areal zones that are transformed by carbonization into carbon-containing layers with different coefficients of thermal expansion of 0.5 mm to 10 mm, particularly preferably 2 mm to 8 mm, most particularly preferably from 3 mm to 7 mm, and especially from 4 mm to 6 mm. In irregular structures the average dimension of the zones formed by the structure is determined by image analysis, wherein the mean dimension is derived by averaging from the measured extensions of each zone, that is to say from the measured distances between the zone boundaries, each in at least three equidistant angles (0°, 60°, 120°), preferably in four angles (0°, 45°, 90° and 135°). The width of the cracks is preferably 0.05 mm to 0.3 mm, more particularly at least 0.07 mm, and especially up to 0.25 mm if crack widths are too small, the beneficial effect on response to wet conditions is diminished, and if the crack widths are too large, wear of the brake linings increases disproportionately. The cited zone has therefore been found to be particularly favorable in experiments.

The thickness (extension parallel to the axis of symmetry or rotation of the cylindrical annular disc) of these zones in the intermediate layer is preferably between 0.2 mm and 2 mm in the carbonized state.

The invention further relates to the use of the friction discs thus obtained as parts of braking and clutch systems, particularly for motor vehicles.

The support body is preferably made from a ceramic material reinforced predominantly with carbon short fibers or short fiber bundles and containing silicon carbide, silicon and carbon. Fibers with a length of up to 60 mm are referred to as short fibers. The bundles preferably contain from about 1,000 to about 12,000 individual fibers. For the support body, it is also possible to create the reinforcement with long fibers (filament yarns or filament bundles, each preferably having 1,000 to 12,000 filaments per bundle or yarn strand) having lengths greater than 50 mm. The fibers and filaments are usually carbon-containing fibers or filaments, preferably made from carbon or graphite, which are particularly preferably also coated with carbon. The mass percentage of fibers and filaments is in the range from 20% to 60%, the mass percentage of SiC is in the range from 30% to 70% and the mass percentage of Si is in the range from 0% to 30%, wherein all mass percentage values (%) are relative to total mass of the support body. The mass percentage of unreacted carbon in the support body that is not present in the form of fibers or filaments is generally less than 15%.

The composition of the friction layer is typically with a mass proportion of (short) fibers in the range from 0% to 35%, the mass fraction of SiC in the friction layer is in the range from 45% to 100%, and the mass fraction of Si in the friction layer is in the range from 0% to 30% relative to total mass of the friction layer.

It is particularly advantageous for the friction disc according to the invention if the abovementioned SiC content in the friction layer is at least 10% higher than the SiC content in the support body. This difference between the materials for the support body and the friction layer is also reflected in the densities thereof. The density of the support body is preferably at least 1.9 g/cm$^3$, more preferably between 2.2 g/cm$^3$ and 2.5 g/cm$^3$. The density of the friction layer is preferably at least 2 g/cm$^3$, particularly preferably in the range from 2.3 g/cm$^3$ to 2.6 g/cm$^3$. The density of the friction layer is preferably at least 5% greater than the density of the support body.

In this context, in one embodiment the areal zones having differing thermal expansion properties in the intermediate layer may be present as adjacent areas with dimensions in the plane parallel to the bottom or top surface of the disc-shaped or cylindrical annular body of preferably at least 0.5 mm and not more than 10 mm, particularly preferably between 1 mm and 8 mm; it is particularly preferable to form the intermediate layer as a fiber-reinforced zone, wherein the reinforcing fibers are preferably provided as a woven fabric or braid, wherein each adjacent, preferably rectangular, particularly preferably square or approximately square zones with aspect ratios of not more than 4:1, more particularly 1.5:1 to 0.7:1 are formed, and more preferably the fiber orientation in each zone is perpendicular to that of at least one of the adjacent zones.

Another option is a loose bond of fiber yarn strands with fiber-free spaces, as in a woven mesh. It is also possible to construct the yarn strands with a twill weave so that diagonally intersecting or herringbone patterns are created in the expansion crack microstructures.

The type of bond, and the most advantageous width of the yarn strand depend on the coefficients of thermal expansion of the ceramic compositions used for the support body and the friction layer; the formation and domain size of the expansion crack microstructure in the friction disc may also be adjusted via the cooling rate after the infiltration with silicon, and the quantity of additive with nucleating effect on the crack formation.

Other features which are considered as characteristic for the invention are set forth in the appended claims.

Although the invention is described herein as embodied in friction discs having a structured ceramic friction layer and a method of producing the friction discs, it is nevertheless, not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

DESCRIPTION OF THE INVENTION

The invention will be explained in greater detail by the following examples.

Example 1

Preparation of a CFRP Preform for a Support Body

A mixture of 15 kg carbon short fiber bundles with about 3,000 fibers per bundle and an average length of 50 mm, which had been impregnated in a preceding step with an aqueous solution of phenolic resole resin, squeezed, dried at about 180° C. in a tumbling dryer, and coated with a layer of pyrolytic carbon at about 800° C. in a gentle stream of argon with carbonization of the phenolic resin deposited on the fibers, 6 kg graphite powder with an average grain size of 10 μm and 9 kg of a phenolic resole resin CELLOBOND® 1203, aqueous solution with a mass percentage of resin of about 71%, Momentive Specialty Chemicals, Inc.) was mixed for five minutes in a high shear mixer. 3 kg was removed from this mixture and placed in a glass mold, and compressed at a temperature of 180° C. and a pressure of 2 MPa to form a cylindrical annular CFRP body having a thickness of 30 mm, an outer diameter of 400 mm and an inner diameter of 200 mm. After demolding, this body was carbonized in nitrogen at a temperature of 900° C. to yield a porous, carbon fiber reinforced carbon body (CFRC body).

Example 2

Preparation of a CFRP Preform for a Friction Layer

To produce the friction-preform, 7.5 kg silicon carbide powder having an average grain diameter of 40 μm was mixed with 2.5 kg of the phenolic resole resin CELLOBOND®

1203, 300 g of this mixture was compressed to form a flat cylindrical ring disc having a thickness of 3 mm, an outer diameter of 400 mm and an inner diameter of 200 mm, and cured at 180° C., and after demolding was carbonized in nitrogen at a temperature of 900° C. to yield a porous carbon body filled with silicon carbide powder.

Example 3.1

Application of the Intermediate Layer With Mesh Fabric

A pasty adhesive composition was mixed from 500 g SiC powder having an average grain size of 6.0 μm and 500 g of the phenolic resole resin CELLOBOND® 1203 in a high shear mixer. This was applied as a full-surface layer with a thickness of about 1 mm on top of the porous preform for the support body of Example 1 using a notched trowel. A carbon filament bundle mesh weave fabric with plain weave consisting of 3 k carbon filaments (bundles with about 3,000 single filaments, the single filaments having a diameter of about 6 μm) and a distance of 5 mm each between the adjacent parallel filament bundles in both the warp and the weft was introduced into this layer, which was placed on the adhesive layer that was deposited over the full contact area. The filament bundles in this arrangement were thus partially impregnated with the adhesive. One preform for the friction layer was then applied to the intermediate layer obtained in this way on each side of the support body, the stack created was then bonded adhesively by heating and simultaneous application of pressure (0.5 MPa) on an extruding machine 130° C.

Example 3.2

Applying the Intermediate Layer by Screen Printing

The liquid adhesive of Example 3.1 was applied to the bottom and cover surfaces of the cylindrical annular supporting body by screen printing, forming an adhesive layer that was interrupted by 5 mm wide furrows at a distance from each other and intersecting the layer at right angles to form isolated square islands. The layer thickness of the adhesive layer was 0.8 mm. The preforms for the friction layers were applied to these adhesive layers, and the resulting stack was compressed as described in Example 3.1.

Example 3.3

Applying the Intermediate Layer by Screen Printing

A pasty adhesive composition was mixed from 500 g titanium boride powder having an average grain size of 4.5 μm and 500 g of the phenolic resole resin CELLOBOND® 1203 in a high shear mixer. The liquid adhesive was applied to the bottom and cover surfaces of the cylindrical annular supporting body by screen printing, forming an adhesive layer that was interrupted by 5 mm wide furrows at a distance from each other and intersecting the layer at right angles to form isolated square islands. The layer thickness of the adhesive layer was 0.8 mm. The preforms for the friction layers were applied to these adhesive layers, and the resulting stack was compressed as described in Example 3.1.

Example 3.4

Applying an Intermediate Layer as a Film

A pasty adhesive composition was mixed from 500 g SiC powder having an average grain size of 6.0 μm and 500 g of the phenolic resole resin CELLOBOND® 1203 in a high shear mixer. This was spread with a layer thickness of 1.4 mm onto an aluminum backing film and dried in a nitrogen stream in an oven at 90° C. The resulting composite film was punched out to form a lattice grid, wherein 4 mm wide webs were formed, intersecting each other at right angles and separated from each other by square spaces with side lengths of 4 mm also. This film was placed on the pre-heated support body with the phenolic resin side facing the body and slight pressure applied, and the aluminum backing film was then removed, wherein the film with the lattice structure remained on the porous support body. After the preforms for the friction layer were placed thereon, the resulting stack was pressed as in Example 3.1.

Example 3.5

Applying an Intermediate Layer as a Film

A pasty adhesive composition was mixed from 500 g titanium boride powder having an average grain size of 4.5 μm and 500 g of the phenolic resole resin CELLOBOND® 1203 in a high shear mixer. This was spread with a layer thickness of 1.4 mm onto an aluminum backing film and dried in a nitrogen stream in an oven at 90° C. The resulting composite film was punched out to form a lattice grid, wherein 4 mm wide webs were formed, intersecting each other at right angles and separated from each other by square spaces with side lengths of 4 mm also. This film was placed on the pre-heated support body with the phenolic resin side facing the body and slight pressure applied, and the aluminum backing film was then removed, wherein the film with the lattice structure remained on the porous support body. After the preforms for the friction layer were placed thereon, the resulting stack was pressed as in Example 3.1.

Example 3.6

Applying an Adhesive Layer Using a Digitally Controlled Applicator

A pasty adhesive composition was mixed from 5 kg SiC powder having an average grain size of 6.0 μm and 5 kg of the phenolic resole resin CELLOBOND® 1203 in a high shear mixer, and then thickened at 70° C. under reduced pressure until the residual water content (percentage by mass) was 0.5%. The compound was deposited at this temperature on both sides of the support body as 2 mm diameter strand in a rectangular chequered pattern with 6 mm separation between each rectangle by an adhesive strand applicator. After the preforms for the friction layer were placed thereon, the resulting stack was pressed as in Example 3.1.

Example 3.7

Applying an Adhesive Layer Using a Digitally Controlled Applicator

The same procedure was used as Example 3.6, but without the addition of the SiC powder. Ground carbon fibers with an average length of 0.6 mm were sprinkled onto the support body with the adhesive strand coating, and the carbon fibers that remained unattached were blown off with a stream of nitrogen. A chequered pattern remained, wherein the adhesive strands had a layer of fibers. When a support body coated on one side was weighed, it was found that the remaining mass of fibers constituted 40% of the mass of the applied adhesive. The preforms for the friction layers were placed on the support body coated on both sides and provided with carbon fibers in the manner described above, and the resulting stack was pressed as described in Example 3.1.

Example 4

Pyrolysis and Siliconization the Composite Body

Siliconization was performed after pyrolysis of the bonded stacks of Examples 1.3 to 7.3 at 900° C. in a nitrogen atmosphere to form a porous preform for the brake disc. Liquid silicon was introduced into the porous preform at a temperature of 1,700° C. and under reduced pressure (3 hPa) through porous CFC wicks, and reacted exothermically with the carbon formed during the carbonization to form silicon carbide. During cooling to room temperature, the different coefficients of thermal expansion in the intermediate layer resulted in a state of tension in the resulting ceramic bodies 4.1 to 4.7, which tension was relieved at least in part by the formation of cracks in the area of the friction layer. The structure of the grid fabric introduced in this manner is reflected in the structure of the expansion crack microstructure of the friction layer.

For comparison purposes, a bonded stack consisting of a preform for a support body was prepared, wherein only the phenolic resin described in the preceding was bonded to each of the cover surfaces of each preform for the friction layers. The stack was carbonized and siliconized in the same manner to form the ceramic body 4.0.

Example 5

Testing Response Behavior in Wet Conditions

Ceramic bodies 4.0 to 4.7 were tested on a test bench under dry and wet conditions, in which they were decelerated from a rotating speed corresponding to a vehicle speed of 80 km/h to a rotating speed corresponding to a vehicle speed of 30 km/h, with a contact pressure of 3 MPa on the brake linings. Graphs of the value of the Coulomb friction index during the braking period from 80 km/h to 30 km/h and the time elapsed were recorded for all brake disc pairs 4.0 to 4.7, each with the same brake lining material (lining bonded with phenolic resin containing by mass percentage 22% phenolic resin, 6% aramid fiber pulp, 20% barium sulphate, 10% potassium titanate, 3% copper in fiber form, 3% calcium hydroxide, 10% ground peanut shells, 3% vermiculite, 3% mica, 3% styrene-butadiene rubber, 3% molybdenum sulphide, 5% graphite, 4% antimony sulphide and 5% zirconium silicate) as the average of ten measurements for each. The results are shown in figures "Example 4.0" to "Example 4.7". To measure wet braking performance, the brake disc rotor was sprayed with salt water from both sides in the measurement chamber (3 L/min, mass percentage of sodium chloride in the salt solution of 3 g/100 g, mass percentage of calcium chloride in the salt solution, 0.4 g/100 g).

In repeat experiments, the lowest dispersion of values and the shortest lag in the onset of braking action, which is to be considered seen as a diminution of the friction index after the first rise in the figures, was found for the brake discs of Examples 4.1, 4.2, 4.4 and 4.6. The surfaces of these brake discs had a uniform pattern of cracks on the friction layer with a mesh size of the cracks from about 3 mm to 6 mm. Thus, according to the method of invention it is also possible to adjust the braking characteristics selectively in the case of wet braking selectively, for example to a lowest possible fall in the friction index after the first rise, to the highest possible friction index in the second rise, or to the most constant friction value possible after the first rise.

The invention claimed is:

1. A method for producing a cylindrical annular friction disc having a microstructure being planned and formed deliberately in a friction layer, which comprises the steps of:
    preparing a preform for a support body of porous carbon;
    preparing a preform for a friction layer body of porous carbon;
    adhesively bonding at least one friction layer preform on the preform for the support body by means of an adhesive layer containing as an organic binder a thermosetting resin, and at least one additive selected from the group consisting of elemental carbon, carbides, nitrides and silicides of metals and semi-metals of groups 13, 14, and 15 according to the current IUPAC nomenclature of periodic table of elements, high temperature-resistant fibers selected from carbon fibers, fibers of binary and ternary compounds of elements Si, C, N, B, O, and P, and whiskers of refractory metals;
    pyrolysing a resulting composite material in an absence of oxidizing agents, thereby obtaining carbon from the organic binder resulting in a carbonized composite;
    infiltrating the carbonized composite with one of a liquid silicon or a liquid alloy containing a mass fraction of at least 50% silicon, thereby forming carbides of silicon and possibly of the other alloy components resulting in a siliconized composite;
    cooling the siliconized composite according to a selectable temperature profile, wherein an intermediate layer is formed from the adhesive layer by the steps of carbonization and infiltration with subsequent reaction to form carbides; and
    forming the adhesive layer as an uneven adhesive layer for assisting in defining a microstructure of the friction layer, the forming step for forming the uneven adhesive layer includes performing one of the steps of:
        providing a carbon filament bundle mesh weave fabric with a plain weave impregnated or coated with an adhesive, the adhesive can be convertible into carbon by heating in an absence of oxidizing substances to temperatures of about 800° C. or more;
        performing an uneven application of the adhesive by one of screen printing or a computer-controlled applicator; or
        solidifying the adhesive on an anti-adhesively treated smooth surface to form a film, from which a grid-shaped overlay is punched out, which later returns to an adhesive state under further heating before reaching a state of a cross-linked and non-melting thermoset.

2. The method according to claim 1, wherein the adhesive is a thermosetting resin or pitch, or a mixture thereof, and the adhesive also contains other additives of heat-resistant inorganic materials.

3. The method according to claim 2, which further comprises providing heat-resistant inorganic materials as the additives, selected from the group consisting of powders of silicon carbide, boron carbide, titanium boride, boron nitride, and mixtures thereof.

4. The method according to claim 1, wherein further comprises modifying the adhesive by performing one of
    sprinkling in heat-resistant fibers selected from the group consisting of fibers of carbon, fibers of silicon carbide, fibers of silicon nitride, whiskers of ceramic materials, and whiskers of metallic materials; or mixing in heat-resistant fibers selected from the group consisting of fibers of carbon, fibers of silicon carbide, fibers of silicon nitride, whiskers of ceramic materials, and whiskers of metallic materials with the adhesive in such manner that when the adhesive solidifies the heat-resistant fibers cause a formation of anisotropic structures.

5. The method according to claim 1, wherein an average dimension of individual areal zones in a structure formed in the intermediate layer that are transformed by carbonization into carbon-containing layers with different coefficients of thermal expansion ranges from 2 mm to 8 mm.

6. The method according to claim 5, wherein a thickness of the areal zones in the intermediate layer is between 0.2 mm and 2 mm in a carbonized state.

7. The method according to claim 1, which further comprises:
reinforcing the preform for the support body of porous carbon with high-temperature-resistant fibers;
forming the preform for the friction layer body of porous carbon with silicon carbide as a filler; and
forming the adhesive layer with at least one of a pitch or a thermoplastic plastic.

8. The method according to claim 1, wherein which further comprises performing the uneven application of the adhesive to a form of a grid that intersects at right angles or in a form of a spider's web with concentric circles or spirals and radii that intersect the circles or the spirals.

* * * * *